April 18, 1961 R. A. GAISER 2,980,817
ELECTROLUMINESCENT STRUCTURE
Filed June 14, 1956

INVENTOR.
Romey A. Gaiser
BY
Nobbe & Swope
ATTORNEYS

United States Patent Office 2,980,817
Patented Apr. 18, 1961

2,980,817
ELECTROLUMINESCENT STRUCTURE
Romey A. Gaiser, Muncie, Ind., assignor to Libbey-Owens-Ford Glass Company, Toledo, Ohio, a corporation of Ohio Filed June 14, 1956, Ser. No. 591,473
10 Claims. (Cl. 313—108)

The present invention relates broadly to an electroluminescent structure and more particularly to an improved electroluminescent structure which acts as a light source.

Certain materials known as phosphors will act as a light source when placed in an electric field produced between the plates of a condenser, and a typical structure comprises two electrically conducting surfaces which act as plates and a dielectric material having field-responsive phosphors imbedded therein disposed between the two plates.

It is necessary that at least one of the plates be transparent in order to allow the light emitted by the phosphor material to pass through without excessive absorption thereof. Generally, the dielectric material is a transparent plastic and the transparent plate is an electrically conducting coating adhered to the surface of a sheet of glass. Such structures are satisfactory as light sources, but have the disadvantage of being comparatively fragile.

Accordingly, it is a primary object of this invention to provide an improved rigid shatter-proof electroluminescent structure which is resistant to high temperatures, moisture and solvent materials.

Recently an electroluminescent unit has been developed in which a metal plate is used for the main body of the unit, and a field-responsive phosphor is suspended in a glass frit medium which is sintered or fired to fuse the glass onto the metal plate. A thin film of a transparent conducting material such as tin oxide is then laid down on the surface of the phosphor containing glass frit dielectric. In such a unit it is necessary to have a thin dielectric layer and difficulties have been encountered in producing the desired field because of dielectric breakdown. Difficulties have also been encountered in producing the desired transparent electrically conducting tin oxide film because of the fluxing action of the glass frit at the filming temperature.

Accordingly, another object of this invention is to provide an electroluminescent structure having a glass frit dielectric and an improved resistance to dielectric breakdown.

A further object of this invention is to provide an electroluminescent structure and a method for making the same having a glass frit dielectric and an improved electrically conducting tin oxide film.

Other objects and advantages of the invention will become more apparent during the course of the following description, when taken in connection with the accompanying drawings.

In the drawings, wherein like numerals are employed to designate like parts throughout the same:

Figure 1:
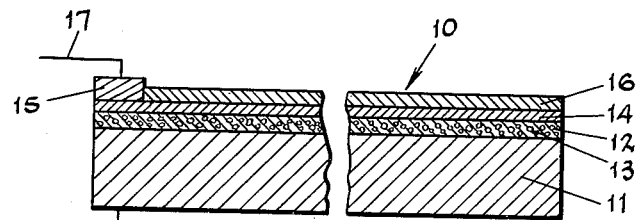
Fig. 1 is a fragmentary cross-sectional view of a typical form of the electroluminescent structure of this invention.

In Fig. 1, there is shown an electroluminescent structure 10 having a base plate 11 which is a rigid sheet of metal material that gives strength and rigidity to the structure 10. A layer of glass frit 12 is fired on to the base sheet 11 in a manner hereinafter discussed, and the layer 12 has particles 13 of a field-responsive phosphor material imbedded therein. Directly over the fired on glass frit 12 is an insulating layer 14 which is preferably a chemically inert, heat resistant material such as an oxide of titanium, aluminum, iron, antimony, palladium or silicon. It is also necessary that the layer 14 be transparent when disposed over the layer 12 as illustrated in Fig. 1.

Referring again to Fig. 1, there is shown an electrode 15 which is secured to the insulating layer 14, and a transparent electrically conducting film 16 overlying the layer 14 and in electrical contact with the electrode 15. Appropriate lead wires 17 and 18 are attached by solder or other means to the electrode 15 and the base plate 11 respectively so that when an electric current is applied through these wires, the base plate 11 and the electrically conducting film 16 act as the plates of a condenser producing a field therebetween which excites the phosphor particles 13 thereby causing them to emit light.

Figure 2:
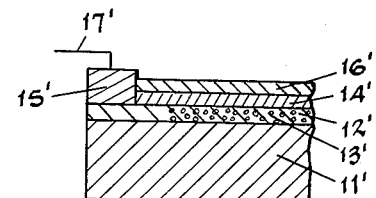
Fig. 2 is a fragmentary cross-sectional view of another form of the electroluminescent structure of this invention.
Figure 3:
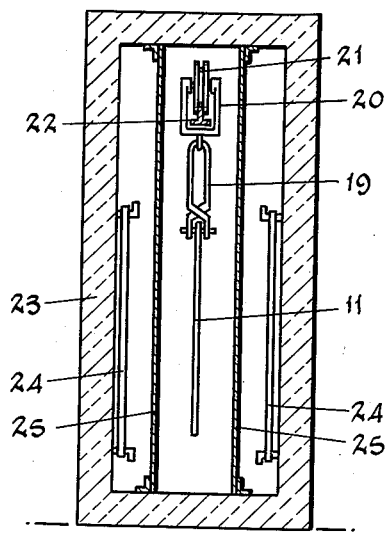
Fig. 3 is a cross-sectional view of a furnace that may be used in the preparation of the electroluminescent structure of this invention.

In the embodiment shown in Fig. 1, the electrode 15 is secured to the insulating layer 14 which extends between the electrode 15 and the base plate 11 thereby insulating that space against dielectric breakdown. However, in the embodiment shown in Fig. 2, it is shown that the electrode 15' may be fired on the glass frit layer 12' and in that event the glass frit 12' which is disposed between electrode 15' and the plate 11' is preferably substantially free of phosphor particles 13' which have a tendency to produce dielectric breakdown.

In order to more fully understand a method of making electroluminescent structure of this invention, the following procedure is given but it is to be understood that it is intended to be illustrative only and not to limit the scope of the invention.

A properly cleaned metal plate 11 is coated with a glass frit containing a field-responsive phosphor and is suspended from tongs 19, hung from a carriage 20 which is provided with wheels 21 running on a monorail 22. The carriage 20 is then moved along the rail 22 to carry it into a furnace 23, within which it can be heated to the temperature desired and the glass frit fired on to form the layer 12.

The furnace 23 can be heated in a suitable manner, such as by means of electric resistant heaters 24, and may be provided with baffles 25 to provide a more uniform temperature throughout.

The glass frit is a powdered glass material which may be fused on heating and has phosphor particles mixed therewith before being fired on to form a unitary glass layer. The phosphor may be any material which will emit light under the influence of an electric field. An example of such a material is the composition made by firing a powdered mixture of 75% zinc sulfide and 25% zinc oxide by weight, with small amounts of an activator such as copper halide, the firing being done between 900° C. and 1250° C. in an atmosphere of inert gas.

Within the furnace 23, the glass is heated to a temperature sufficient to fire on the layer 12 of glass frit to provide a permanent structure. While still hot, the sheet is removed from the furnace 23 and positioned before the spray guns 26, where it is sprayed with a solution of titanium compound to form a titanium oxide film 14.

Figure 4:
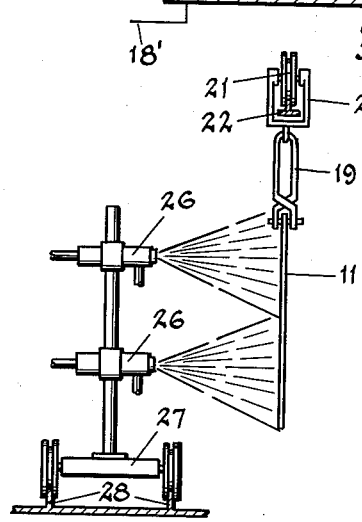
Fig. 4 is a diagrammatic view of one form of apparatus for applying a film or coating to the sheet.

After the titanium oxide coating is set, a glass frit material containing silver in a ratio of about 10 parts of glass frit to 90 parts of silver in a suitable binder is placed along a margin of the panel over the coating 14. With the electrodes in place, the sheet 11 is again returned to the furnace within which it is heated to fire on the electrode 15. After the sheet 11 has reached the required temperature it is removed from the furnace and brought into filming position as shown in Fig. 4 where it is uniformly sprayed over its entire surface with a solution of tin tetrachloride by spray guns 26.

The tin tetrachloride reacts under these conditions to leave a thin, transparent, tightly adherent, electrically conducting coat 16 over the insulating layer 14; and, as can be seen in Fig. 1, the film covers the entire surface of the panel and is in electrical contact with the electrode 15.

In order to obtain a uniform coating of the spray solution over the sheet 10, it is desirable to reciprocate the spray back and forth over the sheet, and for this purpose the spray guns 26 are mounted on a wheeled carriage 27 running on tracks 28. The carriage 27 is moved back and forth over the tracks 28 a sufficient number of times to give a film of the desired thickness on the glass surface, and the filmed sheet is then preferably cooled in the atmosphere, at room temperature, after which it is ready for use.

While the protective coating 14 is shown between the phosphor-containing frit layer 12 and electrically conducting film 16, it may also be located between the phosphor-containing dielectric layer 12 and the plate 11 or a layer 14 may be provided in both places. When a layer such as the layer 14 is filmed onto the plate 11, it provides a base for better adherence of the glass frit to the plate 11 and also prevents poisoning of the phosphor 13 in the event that the plate 11 is such a metal that poisoning is likely.

None of the materials in the electroluminescent structure of this invention are destroyed by heat unless subjected to very high temperatures which is a distinct advantage over the structures containing plastic materials. Also, certain of the plastic materials may be affected by organic solvents whereas none of the proposed materials in the preferred form of this invention may be so affected. Moreover, the structure is supported by a rigid sheet of metal and has an overall strength similar to that of the sheet of metal used.

The insulating layer 14 may be a thin layer of less than 0.001 inch and preferably it is an extremely thin layer having a thickness many times thinner than a thousandth of an inch so that it adds little distance to the space between the electrically conducting plates and yet provides an effective barrier against dielectric breakdown. In addition to providing an extremely thin layer, high refractory materials such as oxides of titanium also serve as a base for the formation of electrically conducting metal oxide layers such as tin oxide which would otherwise tend to be fluxed into the glass frit at the filming temperature and thereby be partially destroyed.

The distance between the electrically conducting plates should be between about 0.001 to 0.015 inch and preferably about 0.002 inch. These small distances are necessary to provide an electric field of high strength for satisfactory excitation of the phosphor since the light produced is an inverse function of the thickness of the dielectric.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:
1. An electroluminescent structure comprising, an electrically conducting plate, a glass frit containing a phosphor material fired on said plate, a thin layer of a chemically inert heat resistant insulating material on said layer of glass frit, and a transparent electrically conducting oxide film on said layer of insulating material.

2. An electroluminescent structure comprising, a plate, a glass frit containing a field-responsive phosphor material fired on said metal plate, a thin transparent layer of a chemically inert heat resistant oxide insulating material on said glass frit, and a transparent electrically conducting metal oxide film on said layer of insulating material.

3. An electroluminescent structure comprising, a metal plate, a glass frit containing a field-responsive phosphor material fired directly onto said metal plate, a thin layer of nonconducting metal oxide on said glass frit, and a transparent electrically conducting metal oxide film on said nonconducting metal oxide layer.

4. An electroluminescent structure comprising, a metal plate, a glass frit containing a field-responsive phosphor material fired directly onto said metal plate, a thin film of an oxide or titanium over said glass frit, and a transparent electrically conducting metal oxide film on said titanium oxide film.

5. An electroluminescent structure comprising, a metal plate, a glass frit containing a field-responsive phosphor material fired directly onto said metal plate, a thin film of an oxide of titanium over said glass frit, said glass frit and film having a thickness of from 0.001 to 0.010 inch, and a transparent electrically conducting tin oxide film on said film of titanium oxide.

6. An electroluminescent structure comprising, a metal plate, a glass frit containing a field-responsive phosphor material fired directly onto said metal plate, a thin layer of a chemically inert heat resistant insulating material on said glass frit, said glass frit and film having a thickness of from 0.001 to 0.010 inch, a transparent electrically conducting film on said layer of insulating material, and an electrode in electrical contact with said transparent electrically conducting film and insulated from said metal plate.

7. An electroluminescent structure comprising a metal plate, a glass frit containing a field-responsive phosphor material fired directly on to said metal plate, a thin layer of a chemically inert heat resistant insulating material on said glass frit, said glass frit and film having a thickness of from 0.001 to 0.010 inch, a transparent electrically conducting film on said layer of insulating material, and an electrode fired on to the layer of glass frit and in electrical contact with said transparent electrically conducting film, said glass frit being substantially free of phosphor material in the area between the electrode and the metal plate.

8. An electroluminescent structure comprising, a metal plate, a glass frit containing a field-responsive phosphor material fired directly on to said metal plate, a thin layer of a chemically inert heat resistant insulating material on said glass frit, said glass frit and film having a thickness of from 0.001 to 0.010 inch, a transparent electrically conducting film on said layer of insulating material, and an electrode in electrical contact with said transparent electrically conducting film and overlying said layer of insulating material.

9. A method of producing an electroluminescent structure comprising the steps of applying a layer of glass frit containing an electroluminescent phosphor onto a metal plate, heating said plate to fire said frit thereon, spraying the heated frit with a compound of a metal that will form a transparent non-conducting layer of the oxide on said frit, and finally applying a transparent electrically conducting film on said non-conducting oxide layer.

10. A method of producing an electroluminescent structure comprising the steps of applying a layer of glass frit containing an electroluminescent phosphor onto a metal plate, heating said plate to fire said frit thereon, spraying the heated frit with a compound of a metal that will form a transparent non-conducting layer of the oxide on said frit, applying at least one strip of glass frit containing metal on said non-conducting oxide layer, reheating the plate to fire said strip of glass frit, and then spraying the heated surface of the non-conducting oxide layer with a compound of a metal that will form a transparent electrically conducting layer of the oxide thereon.

References Cited in the file of this patent

UNITED STATES PATENTS

| | | |
|---|---|---|
| 2,624,857 | Mager | Jan. 6, 1953 |
| 2,684,450 | Mager | July 20, 1954 |
| 2,774,004 | Jaffe | Dec. 11, 1956 |

FOREIGN PATENTS

| | | |
|---|---|---|
| 717,169 | Great Britain | Oct. 20, 1954 |
| 733,260 | Great Britain | July 6, 1955 |

OTHER REFERENCES

Destriau: New Phenomenon of Electrophotoluminescence, Philosophical Mag., October 1947, vol. 38, pp. 700–702, 711–713, 723.